3,066,119
POLYMERS AND COPOLYMERS OF
DIACETYLENES
Lewis S. Meriwether, Norwalk, and Elisabeth C. Colthup, Greenwich, Conn., assignors to American Cyanamid Company, New York, N.Y., a corporation of Maine
No Drawing. Filed Apr. 1, 1959, Ser. No. 803,375
10 Claims. (Cl. 260—88.2)

This invention relates to new synthetic materials and more particularly to new and useful linear copolymers of a monosubstituted acetylene with a terminal unconjugated diacetylene. These linear copolymers may be represented by the following general formula:

(I)      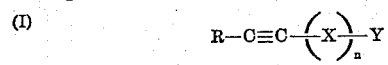

in which X represents at least one member of the class consisting of

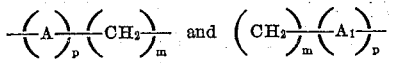

Y represents a member of the class consisting of

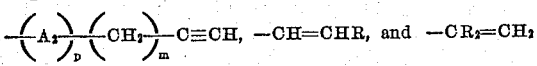, $-C{\equiv}CH$, $-CH{=}CHR$, and $-CR_2{=}CH_2$

A, $A_1$ and $A_2$ in each of the above formulas representing at least one member of the class consisting of $-CR_3{=}CH-$, $-C{\equiv}C-$, $>C{=}CH_2$, $<C{=}CH-$, $-CH{=}C<$ and $-CH{=}CR_4-$; and R, $R_1$, $R_2$, $R_3$ and $R_4$ in each of the above formulas representing a member of the class consisting of hydrogen, alkyl, cycloalkyl, aryl, alkaryl, aralkyl, hydroxyalkyl, and dialkylaminoalkyl; n represents a number having an average value ranging from 1–100; p represents a number from 1–100; and m represents a number from 0–20.

Illustrative examples of radicals represented by R, $R_1$, $R_2$, $R_3$, and $R_4$ in the above formulas are methyl through octadecyl or higher, cyclopropyl through cycloheptyl, phenyl, naphthyl, tolyl, benzyl, 3-(5-indanyl)-propyl, 4-(6-tetralyl)butyl, methylol, isopropylol, and dialkylaminoalkyl groups, wherein the alkyl components thereof are the same examples of alkyl radicals mentioned above with reference to R, $R_1$, etc. The invention is not intended to be restricted by way of the above illustrative groups.

The important feature of these copolymers is that they are made in varying degrees of unsaturation depending on the proportion of the mono-substituted acetylene copolymerized with the unconjugated diacetylenes.

Further the invention relates to homopolymers of the unconjugated diacetylenes which are also new and contain both aromatic and linear groupings. The higher homopolymers of these unconjugated diacetylenes are found from infrared data to contain both 1,2,4,-trisubstituted aromatic and linear polyacetylene groupings. The molecular weights of these higher polymers are very high and therefore suggest that much cross-linking has taken place. These high molecular weight homopolymers have a variety of physical properties, e.g., soluble oils which manifest drying properties, film-forming thermoplastic compounds, and solid, high-melting thermosetting resins.

The structures of the lower homopolymers which have been fully identified are in complete agreement with the structures postulated for the high polymers. The trimers of both 1,6-heptadiyne and 1,7-octadiyne are unique in that they are produced in definite structures which are as follows:

II
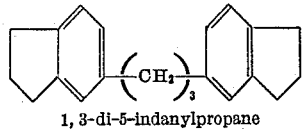
1, 3-di-5-indanylpropane

III
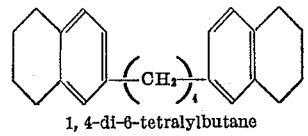
1, 4-di-6-tetralylbutane

One object of the present invention is to provide a new and useful class of linear copolymers from relatively inexpensive raw materials. The linear copolymers with which this invention is concerned can be isolated and used alone in various applications.

Another object of the invention is to provide new and useful homopolymers of unconjugated diacetylenes.

A further object is to provide the new compounds 1,3-di-5-indanylpropane and 1,4-di-6-tetralylbutane.

Still other objects of the invention will be apparent to those skilled in the art from the following more detailed description.

The above series of copolymers and homopolymers is made by refluxing the basic monomer or monomers in an inert solvent such as benzene, cyclohexane, acetonitrile, ethanol or the like while in the presence of a nickel-carbonyl-phosphine catalyst. Exceptions to this procedure are in the use of more volatile acetylenes such as acetylene, propyne and butyne-1 which must be reacted in an autoclave under super-atmospheric pressure.

The reaction conditions are not critical nor are the solvents. The reactions are usually carried out conveniently at the temperatures at which the solvent refluxes. However, the upper limit for the reaction temperature is only governed by the temperature at which the products and catalysts decompose. Since there is usually an exotherm from the reaction, excessive use of high temperatures is both unnecessary and undesirable. A large variety of solvents may be employed which include both polar and non-polar types.

In selecting a solvent for the reaction, it is most desirable to choose one which will mutually dissolve the monomers, catalysts, and products. When insoluble high polymers are produced they can be conveniently separated from the reaction mass in pure form by filtration. This provides a convenient method of separating low and high polymers when formed together.

The nickel-carbonyl-phosphine catalysts have the following general formula:

IV.

where R is an alkyl, cycloalkyl, cyanoalkyl, aryl, alkoxy or aryloxy radical and n is 2 or 3. These catalysts are more fully disclosed and claimed in copending application Serial No. 774,150, filed November 17, 1958.

It was quite surprising and unexpected that these linear copolymers of the aforementioned mono-substituted acetylenes with the unconjugated diacetylenes could be obtained by polymerization as described previously above and more fully hereinafter, since prior investigators reported that unsubstituted acetylene and certain substituted acetylenes employed in practicing the present invention yielded benzene or benzene derivatives [see Kleinschmidt, U.S. Patent 2,542,417; Rose et al., J. Chem.

Society, 1950, pp. 69 and 70] when reacted under similar conditions. It has been found that the polymers of these unconjugated acetylenes or copolymers of these with substituted acetylenes cover a very broad field.

The formation of the above described trimers of 1,6-heptadiyne and 1,7-octadiyne and of dimer products from the reaction of one diacetylene with one monoacetylene by using a nickel-carbonyl-phosphine catalyst is totally unexpected, especially in view of the unique manner in which the combination takes place, as clearly shown in the following examples:

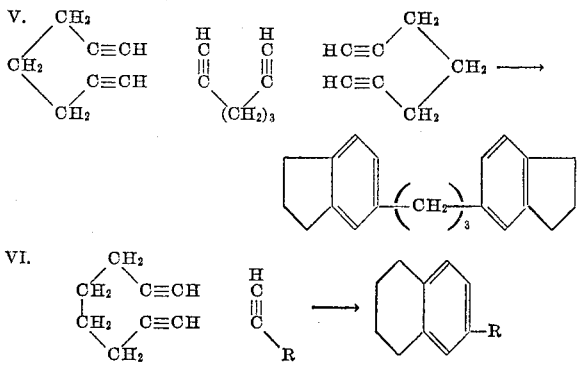

It should be noted that the carbon atoms adjacent to the alkylene chains become bonded to each other and form part of the indanyl or tetralyl structure which is in the final product.

This reaction is quite different from the trimerizations of acetylenes disclosed by Reppe et al., Kleinschmidt et al., etc. in which the acetylenes combine in the following manner:

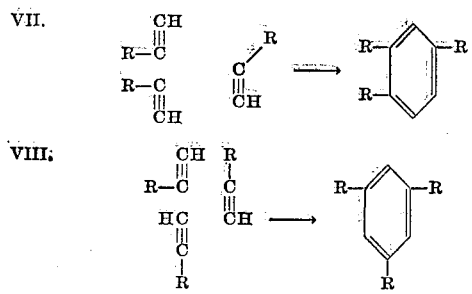

It should be noted that in the last-mentioned reaction two isomers are produced, the 1,2,4- and 1,3,5-trisubstituted benzenes, while in the reaction involved in this invention only the 1,2,4-trisubstituted aromatic product is possible.

By copolymerizing two different, unconjugated acetylenes it is also possible to make unsymmetrical compounds, for example, when 1,6-heptadiyne is copolymerized with 1,7-octadiyne the following compounds may be obtained:

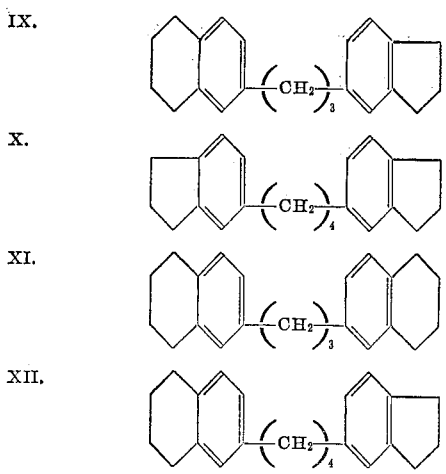

The first two compounds are formed when two molecules of 1,6-heptadiyne react with one molecule of 1,7-octadiyne while the second two compounds are formed when one molecule of 1,6-heptadiyne reacts with two molecules of 1,7-octadiyne.

Another feature of this invention is the effect of different catalysts on the structure of the resulting polymers. In Example 2 which follows, where the catalyst is $Ni(CO)_2(\phi_3P)_2$ the number of linear groupings in the polymer is not nearly as large as the number of linear groupings of the polymer in Example 3 where $$Ni(CO)_2[P(CH_2CH_2CN)_3]_2$$

is the catalyst. This evidence shows that it is possible to vary the type of groups within the polymer molecule by using different nickel-carbonyl-phosphine catalysts. (By the symbol $\phi$ in the foregoing formulas and other formulas hereinafter given is meant the phenyl radical or grouping.)

The following examples are presented by way of illustration in order that the invention be more easily understood and not by way of limiting the scope of the invention. The following examples are set forth in which all parts are by weight unless otherwise indicated.

*Example 1*

Twenty parts of 1,5-hexadiyne and one part of $$Ni(CO)_2(\phi_3P)_2$$

were refluxed in 400 parts of cyclohexane for 3 hours. Aliquots taken during the reaction showed that 100% reaction of the acetylene had occurred in 2 hours, by analysis of the 2140 cm.$^{-1}$ band in the infrared. The solvent was removed from the dark brown solution. A tan amorphous cork-like polymer remained (12 parts), which was insoluble in all solvents and decomposed slowly above 300° C. to a black powder. It was impossible to obtain an infrared spectrum of this polymer.

*Example 2*

Twenty-three parts of 1,6-heptadiyne and 1 part of $Ni(CO)_2(\phi_3P)_2$ were refluxed in 100 parts of cyclohexane for 3 hours. Aliquots taken during the reaction showed that 100% of the acetylene compound had reacted in 2½ hours, by analysis of the 2140 cm.$^{-1}$ band in the infrared. After removal of the solvent, the dark brown liquid remaining (20 parts) was distilled under vacuum. Five parts of colorless trimer (B.P. 180° C./0.2 mm.) distilled over. *Analysis*: Calcd. for $C_{21}H_{24}$: C, 91.30; H, 8.70; M.W. 276. Found: C, 91.50; H, 8.87; M.W. 276 (mass spectrum), 241 (cryoscopic benzene). The compound had a strong infrared band at 810 cm.$^{-1}$ indicating a 1,2,4-trisubstituted aromatic structure. The ultraviolet spectrum ($a_{278}$=12.95, $a_{273}$=12.33) was identical with that of 5-methylindane. This trimer is therefore 1,3-di-5-indanyl propane. The pot residue from the distillation (15 parts) was a high polymer of 1,6-heptadiyne containing both 1,2,4-trisubstituted aromatic and linear polyacetylene groupings (infrared bands at 975 and 810 cm.$^{-1}$).

*Example 3*

Thirty parts of 1,6-heptadiyne and one part of $$Ni(CO)_2[P(CH_2CH_2CN)_3]_2$$

were refluxed in 250 parts of acetonitrile under carbon dioxide for 6 hours. Infrared analysis of aliquots indicated 100% reaction of the acetylene in 5½ hours. During the reaction a dark brown viscous layer of polymer insoluble in acetonitrile formed on the bottom of the reaction vessel. After separation from the solution, 23 parts of the insoluble product were obtained which was a high polymer of 1,6-heptadiyne containing both 1,2,4-trisubstituted aromatic and linear polyacetylene groupings (infrared bands at 975 and 810 cm.$^{-1}$) analogous to that obtained in Example 2 except that the polymer was much richer in linear polyactylene groups. Two parts of 1,3-di-5-indanylpropane were obtained from the acetonitrile solution.

Example 4

Twenty-seven parts of 1,7-octadiyne and one part of Ni(CO)$_2$($\phi$P)$_2$ were refluxed in 100 part of cyclohexane for 2 hours. Aliquots taken during the reaction showed that 100% reaction of the acetylene had occurred in 2 hours, by analysis of the 2140 cm.$^{-1}$ band in the infrared. At the end of the reaction the mixture was a gel in which all of the solvent had been occluded in the polyacetylene. After the solvent was removed by evaporation, a tan powdery material remained, M.P. about 250° C. (dec.), which again swelled when placed in a hydrocarbon solvent, but was not soluble. The polymer produced infrared absorption at 3300 (weak), 1510, 975, and 810 cm.$^{-1}$ and ultraviolet absorption at 278 m$\mu$ ($a$=2.05) and 268 m$\mu$ ($a$=2.43).

Example 5

1,6-heptadiyne (14 parts) and 1,7-octadiyne (16 parts) and one part of Ni(CO)$_2$($\phi_3$P)$_2$ in 220 parts of cyclohexane were refluxed under nitrogen for 3 hours. Analysis of the 2040 cm.$^{-1}$ band in the infrared showed that 100% of the acetylenes had reacted at the end of 3 hours. The brown liquid remaining after removal of solvent (27 parts) had infrared bands at 975 and 810 cm.$^{-1}$ indicating the presence of both linear acetylene polymers and 1,2,4-trisubtituted aromatic products. Mass spectrographic and ultraviolet spectrophotometric analysis indicated the presence of the following compounds:

| Mass No. | Empirical Formula | Identity |
|---|---|---|
| 276 | (C$_7$H$_8$)$_3$ | 1,3-di-5-indanylpropane. |
| 290 | (C$_7$H$_8$)$_2$(C$_8$H$_{10}$) | 1,4 - di - 5 - indanylbutane and 1 - (5-indanyl)-3-(6-tetralyl)-propane. |
| 304 | (C$_7$H$_8$)(C$_8$H$_{10}$)$_2$ | 1, 3 - di - 6 - tetralylpropane and 1 - (5-indanyl)-4-(6-tetralyl)-butane. |
| 318 | (C$_8$H$_{10}$)$_3$ | 1,4-di-6-tetralylbutane. |

The product also contained high polymers.

Example 6

1,5-hexadiyne (19 parts), heptyne-1 (25 parts) and 2 parts of Ni(CO)$_2$($\varphi_3$P)$_2$ were refluxed in 350 parts of cyclohexane for 3 hours. About 70% reaction of the acetylene had occurred in 3 hours. The solvent and unreacted monomers were removed leaving a dark brown liquid, whose infrared spectrum indicated the presence of linear polyacetylene groups and 1,2,4-trisubstituted aromatic groups (bands at 975, 895 and 820 cm.$^{-1}$). A film rapidly formed on the surface of the liquid which was brittle when dried. Mass spectrographic analysis of the brown liquid showed the presence of the dimer and trimer of heptyne-1 and unidentified higher molecular weight products giving rise to fragments with the masses 278, 277, 232, and 175.

Example 7

Heptyne-1 (16 parts) and 1,6-heptadiyne (16 parts) and 1 part Ni(CO)$_2$($\phi_3$P)$_2$ in 75 parts of cyclohexane were refluxed for 3 hours. Infrared analysis of the aliquots indicated 100% reaction of acetylene in 2½ hours. The solvent was removed and the dark brown liquid remaining was fractionated under vacuum. The following fractions were obtained:

| Fraction | B.P. | Parts | Description |
|---|---|---|---|
| 1 | 80° C./0.2 mm | 20.5 | heptyne dimer (2 parts)+ 5-n-amylindane (18.5 parts). |
| 2 | 100° C./0.2 mm | 2.5 | heptyne trimer. |
| 3 | 120° C./0.2 mm | .5 | heptyne tetramer. |
| 4 | 180° C./0.2 mm | 2.5 | 1,3-di-5-indanylpropane. |
| 5 | pot residue | 3.0 | higher polymers. |

Example 8

Thirteen parts of 1,7-octadiyne and 12 parts of heptyne-1 were refluxed in 150 parts of cyclohexane containing one part of Ni(CO)$_2$($\phi_3$P)$_2$ for 3 hours. All of the acetylenes reacted during this period. The infrared spectrum of the solution at this time contained bands at 975 cm.$^{-1}$ (strong) and 820 cm.$^{-1}$ (med.). When the cyclohexane was removed 20 parts of a mixture of an insoluble gel-like polymer and a dark brown oil was obtained. Mass spectrographic and infrared analysis of the oil gave the following results:

| Mass No. | Percent of constituents having M.W. less than 400 | Empirical formula | Identity |
|---|---|---|---|
| 192 | 3 | (C$_7$H$_{12}$)$_2$ | heptyne dimer. |
| 202 | 75 | (C$_8$H$_{10}$)(C$_7$H$_{12}$) | 6-amyltetralin. |
| 288 | 13 | (C$_7$H$_{12}$)$_3$ | heptyne trimer. |
| 298 | 2 | (C$_8$H$_{10}$)(C$_7$H$_{12}$)$_2$ | (C$_5$H$_{11}$—C≡C—CH=CH—CH$_2$CH$_2$—)$_2$. |
| 318 | 1 | (C$_8$H$_{10}$)$_3$ | 1,4-di-6-tetralylbutane. |

Higher polymers (M.W. greater than 400) were also present in the mixture.

Example 9

Seventy parts of pentyne-1, 7 parts of 1.6-heptadiyne and two parts of Ni(CO)$_2$[CH$_2$CH$_2$CN)$_3$]$_2$ were refluxed in 300 parts of acetonitrile under nitrogen for 3 hours. At the end of this period all of the acetylene had reacted by infrared analysis of the solution. During the reaction 10 parts of a polymeric brown solid was formed whose infrared spectrum indicated the presence of 1,2,4-trisubstituted aromatic groups. The solvent was removed from the liquid phase leaving a pale yellow film-forming resin (50 parts) which was insoluble in petroleum ether but soluble in benzene. The benzene solution was filtered and the solvent removed, leaving 45 parts of the pale yellow resin whose infrared spectrum indicated the presence of 1,2,4-trisubstituted aromatic groups.

Example 10

Two parts of 1,7-octadiyne and 38 parts of pentyne-1 were refluxed with one part of

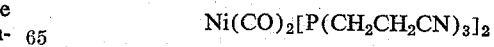
Ni(CO)$_2$[P(CH$_2$CH$_2$CN)$_3$]$_2$ in 200 parts of acetonitrile for 4 hours. Infrared analysis of aliquots showed that all of the acetylene groups had reacted in 2½ hours. Petroleum ether (200 parts) were added to the cooled reaction mixture and it was washed with 10% aqueous HCl and finally water. The petroleum ether layer was separated, dried, and the petroleum ether was removed. An orange, gummy polymer remained (33 parts) which was soluble in petroleum ether and benzene. The infrared spectrum of this polymer contained bands only for linear polyacetylene groups (975 and 895 cm.$^{-1}$); no aromatic groups were present.

The structures of the polymers herein described have been determined by infrared and ultraviolet spectrophotometry, by mass spectrography and in some cases by elemental analysis. The presence of linear polyacetylene groupings in the polymers is demonstrated by infrared bands at 1625–1650, 970–980, and 890–900 cm.$^{-1}$ and by ultraviolet absorption in the 250–300 m$\mu$ region. The 1,2,4-trisubstituted aromatic groups are distinguished by infrared absorption in the 1600–1625, 1500–1525, 860–880, and 800–820 cm.$^{-1}$ regions and ultraviolet absorption between 270 and 280 m$\mu$ with $a=10$–15. The relative amounts of linear polyacetylene groups and aromatic groups could be estimated by comparison of the intensities of the 970–980 cm.$^{-1}$ and 800–820 cm.$^{-1}$ infrared bands of the polymer or copolymer. In the polymer the linear polyacetylene groups and the aromatic groups are joined together by a lattice of polymethylene groups. In the insoluble high-melting homopolymers this lattice is 3-dimensional resulting in a highly cross-linked polymer. In the soluble higher homopolymers and copolymers the polymer chains are mostly linear with little cross-linking of polymethylene chains. The molecular weights of these polymers range from 1000 to at least 100,000.

The structures of the lower homopolymers and copolymers have been determined primarily by comparing their mass spectra with their infrared and ultraviolet spectra. They generally contain only 1,2,4-trisubstituted aromatic groups. All of these products had parent peaks in their mass spectrum which corresponded to their molecular weight. For example, the mass spectrum of the low polymer product from the copolymerization of 1,6-heptadiyne with 1,7-octadiyne contained parent peaks for mass numbers 276,290, 304, and 318, which corresponded to 3 heptadiynes, 2 heptadiynes-1 octadiyne, 1 heptadiyne-2 octadiyne, and 3 octadiynes, respectively. The relative amounts of these various products could also be determined by the relative peak heights.

The linear copolymers of this invention which are defined by the above Formula I contain a triple bond in one of their terminal groups as evidenced by their infrared and Raman spectra. Contrary to what might be expected this triple bond is always found to be free from combination with any components of the reaction medium.

The unconjugated diacetylenes are obtained commercially. However, they may be easily prepared by bromination of the corresponding diene and subsequently fully dehydrohalogenating with a strong base such as KOH.

By varying the amount of the unconjugated diacetylene reacted with the mono-substituted acetylenes various degrees of unsaturation can be obtained. High polymers of widely varying crystallinity and unsaturation which are the result of this variation should be of great utility. This control of unsaturation is important in the preparation of polymers which are to be used as drying oils or ultraviolet light absorbers. The amount of unsaturation also determines the amount of cross-linking possible.

In addition to being drying oils the properties of certain of the polymers suggest their use as bulk polymers, novel monomers for copolymerization with other unsaturated monomers and as intermediates for making polyalcohols, polyepoxides, epoxide resins, etc.

The lower homopolymers of the unconjugated diacetylenes, namely, those defined by Formulas II, III, IX, etc., are by their very nature good high-boiling solvents for use in applications where a solvent having properties intermediate between those of an aromatic hydrocarbon solvent and those of an aliphatic hydrocarbon solvent are desired.

The higher homopolymers of 1,6-heptadiyne are shown to have drying characteristics by the following example.

*Example 11*

The polymer of HC≡C(CH$_2$)$_3$C≡CH which has been prepared by the method set forth in Example 2 is tested for its drying characteristics as follows: A film is cast from a 60% solution of polymer in toluene containing about 0.25% of a 6% solution of cobalt naphthenate in mineral spirits. The film is tack-free in less than a day.

The scope of this invention is intended to cover the use of all the other polymers embraced by all the above formulas and more particularly those polymers such as produced as described in Examples 1–10.

Various drying catalysts which may be employed with the polymers are calcium, lead and cobalt naphthenate and calmium, lead, cobalt and iron octoate. However, none of these drying catalysts have any particular advantage over any other catalysts and, therefore, these drying catalysts are presented with the intention of illustrating and aiding in the use of the invention and not with the intention of limiting the use of the hereinbefore described polymers with the above recited drying catalysts. These drying catalysts were usually added in amounts ranging from .01 to .50%, by weight of the polymer.

We claim:
1. A substantially linear polymer having a molecular weight of at least 1000 and represented by the formula:

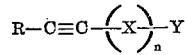

in which X represents one member of the class consisting of

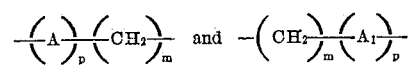

Y represents a member of the class consisting of

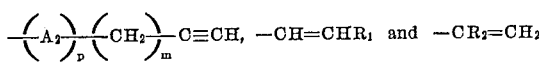

A, A$_1$ and A$_2$ in each of the above formulas representing at least one member of the class consisting of —CR$_3$=CH—, —C≡C—, >C=CH$_2$, >C=CH—, —CH=C< and —CH=CR$_4$—; and R, R$_1$, R$_2$, R$_3$ and R$_4$ in each of the above formulas representing a member of the class consisting of the same hydrogen, alkyl, cycloalkyl, aryl, alkaryl, aralkyl, hydroxyalkyl and dialkylaminoalkyl groups; $n$ represents a number having an average value ranging from 1–100; $p$ represents a number having an average value ranging from 1–100; and $m$ represents a number from 1–20.

2. A method of polymerizing an acetylene which comprises heat-reacting a monoacetylene with an unconjugated diacetylene in the presence of catalytic quantities of a nickel-carbonyl-phosphine catalyst having the general formula:

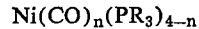

wherein R is a member selected from the group consisting of alkyl, cycloalkyl, cyanoalkyl, aryl, alkoxy and aryloxy and $n$ is a whole integer between 2 and 3 inclusive.

3. A method of polymerizing an unconjugated diacetylene represented by the general formula HC≡C(CH$_2$)$_m$C≡CH wherein $m$ represents a number from 1–20, which comprises polymerizing by heating the said acetylene in the presence of catalytic quantities of a nickel-carbonyl-phosphine catalyst having the general formula:

wherein R is a member selected from the group consisting of alkyl, cycloalkyl, cyanoalkyl, aryl, alkoxy and aryloxy and $n$ is a whole integer between 2 and 3 inclusive.

4. The method as set forth in claim 3 wherein $m=2$.
5. The method as set forth in claim 3 wherein $m=3$.
6. The method as set forth in claim 3 wherein $m=4$.
7. A substantially linear homopolymer of a monomeric compound represented by the general formula:

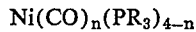

[HC≡C(CH$_2$)$_m$C≡CH], wherein $m$ represents a number from 1 to 20 and wherein said homopolymer has a molecular weight of at least 1000.
8. The homopolymer of claim 7 wherein $m=2$.
9. The homopolymer of claim 7 wherein $m=3$.
10. The homopolymer of claim 7 wherein $m=4$.

References Cited in the file of this patent

UNITED STATES PATENTS

| | | | |
|---|---|---|---|
| 2,387,989 | Foster | Oct. 30, | 1945 |
| 2,540,736 | Kalb | Feb. 6, | 1951 |
| 2,609,364 | Zoss | Sept. 2, | 1952 |
| 2,667,520 | Herrick | Jan. 26, | 1954 |
| 2,697,028 | Baker et al. | Dec. 14, | 1954 |
| 2,723,299 | Tanaka et al. | Nov. 8, | 1955 |
| 2,737,537 | Taylor et al. | Mar. 6, | 1956 |
| 2,810,716 | Markus | Oct. 22, | 1957 |
| 2,839,514 | Shokal et al. | June 17, | 1958 |
| 2,880,252 | Raley et al. | Mar. 31, | 1959 |

OTHER REFERENCES

Henne et al., Journal Amer. Chem. Soc., vol. 65, pages 2020–2023 (1943).

UNITED STATES PATENT OFFICE
CERTIFICATE OF CORRECTION

Patent No. 3,066,119                                      November 27, 1962

Lewis S. Meriwether et al.

It is hereby certified that error appears in the above numbered patent requiring correction and that the said Letters Patent should read as corrected below.

Column 1, line 25, the formula should appear as shown below instead of as in the patent:

same column 1, line 28, the formula should appear as shown below instead of as in the patent:

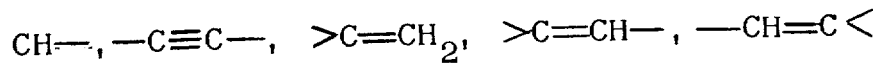

Signed and sealed this 21st day of January 1964.

(SEAL)                                                           EDWIN L. REYNOLDS
Attest:
ERNEST W. SWIDER Attesting Officer                                    Acting Commissioner of Patents